(12) United States Patent
Duvivier

(10) Patent No.: US 8,465,039 B2
(45) Date of Patent: Jun. 18, 2013

(54) BIKE WITH BELT TRANSMISSION AND ITS FRAME

(75) Inventor: Mickael Duvivier, Chatillon (FR)

(73) Assignee: Matra Manufacturing & Services, Paris (FR)

( * ) Notice: Subject to any disclaimer, the term of this patent is extended or adjusted under 35 U.S.C. 154(b) by 175 days.

(21) Appl. No.: 13/072,515

(22) Filed: Mar. 25, 2011

(65) Prior Publication Data
US 2011/0241307 A1 Oct. 6, 2011

(30) Foreign Application Priority Data

Apr. 1, 2010 (FR) ...................................... 10 52489

(51) Int. Cl.
*B62K 15/00* (2006.01)

(52) U.S. Cl.
USPC ........................................ 280/281.1; 280/261

(58) Field of Classification Search
USPC ................................. 280/281.1, 259, 260, 261
See application file for complete search history.

(56) References Cited

U.S. PATENT DOCUMENTS

| 4,427,209 | A | * | 1/1984 | Morita | 280/281.1 |
| 4,763,913 | A | * | 8/1988 | Ehrlich | 280/281.1 |
| 6,220,614 | B1 | * | 4/2001 | O'Neil | 280/220 |
| D533,812 | S | * | 12/2006 | Hoisington | D12/111 |
| 7,377,534 | B2 | * | 5/2008 | Ellsworth | 280/281.1 |
| D612,300 | S | * | 3/2010 | Lobnitz | D12/111 |
| 2007/0241532 | A1 | * | 10/2007 | Ellsworth | 280/281.1 |

FOREIGN PATENT DOCUMENTS

| DE | 17 72 869 | 8/1958 |
| DE | 21 66 756 A1 | 7/1975 |
| DE | 32 11 383 A1 | 10/1983 |
| DE | 32 44 466 A1 | 6/1984 |
| WO | WO-03/029072 A1 | 4/2003 |

OTHER PUBLICATIONS

Search Report for FR 1 052 489, dated Aug. 12, 2010.

* cited by examiner

*Primary Examiner* — Kevin Hurley
(74) *Attorney, Agent, or Firm* — Marshall, Gerstein & Borun LLP

(57) ABSTRACT

Bike comprising a first frame element extending from one end carrying a front wheel housing to a lower end, a second frame element extending to a lower end rigidly fixed to the first lower end, a rear fork comprising a chainstay extending from the first element to a spindle support and a seat stay extending from the spindle support to the second element, a crankset having a lateral chainring, a rear wheel driven by a sprocket inside the fork, a belt engaged with the chainring and the sprocket. The chainstay has a major portion arranged below a straight line passing through the lower ends of the chainring and of the sprocket. The belt extends through the triangle formed by the second frame element, the chainstay and the seat stay, which form an irremovable assembly.

9 Claims, 4 Drawing Sheets

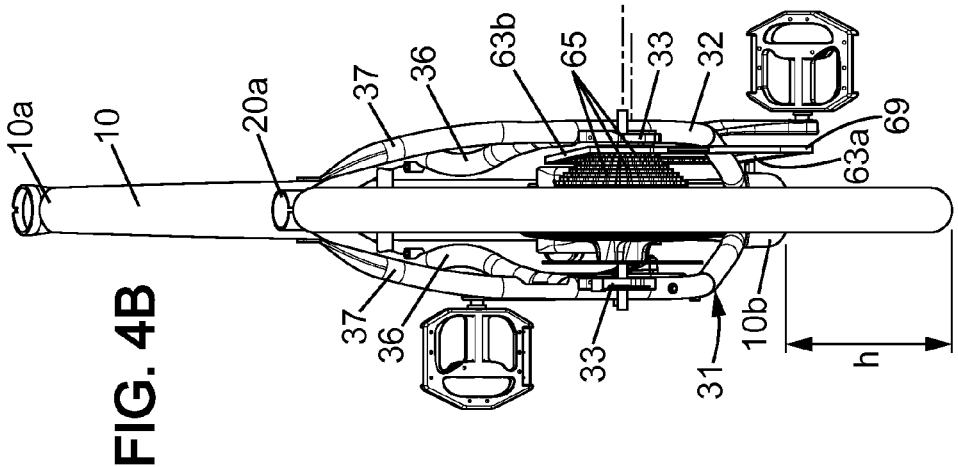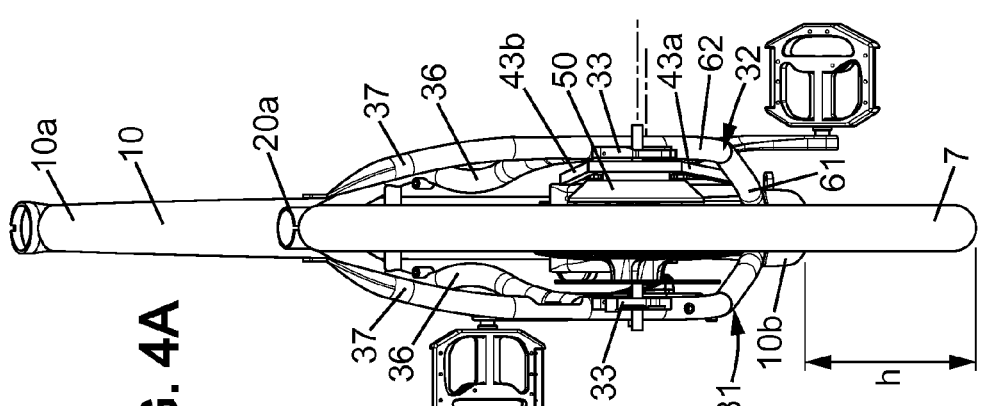

BIKE WITH BELT TRANSMISSION AND ITS FRAME

The present invention relates in particular to a bike for which the transmission of the force between the chainring and the sprocket is provided by a belt, and in particular but not exclusively for an electrically assisted bike. It should be noted that the term 'chainring' is used in the present specification even though a belt may be used instead of a chain.

More particularly, the invention relates to a bike comprising:
- a first frame element extending from an upper end carrying a steering tube of a front wheel to a lower end;
- a second frame element extending from an upper end receiving a seat unit to a lower end rigidly fixed to the lower end of the first frame element;
- a rear wheel fork comprising at least one lateral chainstay element extending from the lower end of the first frame element to a rear wheel spindle support and a seat stay extending from said support to the second frame element;
- a crankset having a crank spindle borne by the frame and a chainring arranged laterally outside with respect to the first and second frame elements;
- a rear wheel driven by a coaxial sprocket arranged inside with respect to the rear wheel fork; and
- a drive belt forming a continuous loop engaged with the driving chainring and the sprocket.

This type of frame, in particular at the level of the rear fork, is standard for two-wheelers of bike type and its advantages in terms of solidity, stiffness and lightness are demonstrated. Such a structure with a chainring outside and a sprocket inside with respect to the triangle formed by the second frame element, the chainstay element and the seat stay, causes no problem with a chain transmission. In fact, the chain can easily be opened by detaching a link so as to encircle the chainstay element and be closed again so as to form a loop around this element.

Belt transmissions have some advantages over chain transmissions, such as virtually no maintenance and very quiet operation. The incorporation of a gear change system with a belt transmission presents difficulties, even if it is not totally excluded in particular using a gear change system integrated into the wheel hub. In fact, systems with multiple sprockets and a derailleur with an idler pulley are very difficult to adapt to a belt transmission.

However, the inventor has noted that with electrically assisted bikes, the need to have multiple gears available is not as essential as with standard bikes, at least for urban use. The starting phases of the latest electrically assisted systems have sufficiently good performance to ensure that the user no longer needs to select a lower gear in order to obtain a sufficiently quick start.

The use of belt transmissions is widely known in the field of motorbikes, but the architecture of this type of two-wheeler is substantially different and does not pose the same problems. The rear wheel is then most often borne by a pair of articulated arms at the end of which suspension elements are connected in a removable manner, which allows a belt to be passed through. It is also possible to arrange the drive sprocket outside these arms, which does not cause interference for a motorbike given the lateral space requirement of this type of vehicle, but which would constitute a potentially dangerous markedly protruding part for a bicycle.

A few two-wheelers having a standard bike frame with a belt transmission are known, such as for example from the document US20090236819. But then it is provided that the lug receiving the wheel spindle is fixed in a removable manner to the rear end of the chainstay element and to the lower end of the seat stay. This allows an opening to be created through which the belt can pass. Similarly, according to DE1772689 or DE324466, the possibility of dismantling the frame is provided, for example in order to change the belt or for another reason. Such systems with lugs or elements that are removable increase the complexity of the frame, but can also pose problems of reliability and structural strength, not to mention the occurrence of noise if the lug is not perfectly immobilized.

Therefore a need exists to achieve a practical implementation of a two-wheeler comprising a frame of bike type with the expected qualities of this type of frame, but which can benefit from the advantages of a belt transmission without having the drawbacks linked to installing the latter.

To this end a subject of the present invention is a bike of the type mentioned above wherein the chainstay element has a major portion arranged below a straight line extending from the lower end of the chainring to the lower end of the sprocket, wherein the transmission belt has an outward strand and a return strand both extending through the triangle formed by the second frame element, the chainstay element and the seat stay, these three elements forming an irremovable stiff assembly, and wherein the axis of the crankset is situated at a vertically measured distance from the upper face of the chainstay element of the first frame element, said distance being at most slightly greater than the radius of the chainring.

Thanks to these arrangements, the entire belt passes through the triangle of the rear fork to engage with the inner sprocket and no element of the frame has to be removed when installing or changing the belt. For the major portion of the chainstay element to be arranged below the belt, i.e. arranged in a substantially lower position with respect to the conventional chainstay elements extending from the crankset housing to the rear wheel support, it is necessary that this element or one of the two frame elements, has a developed length somewhat greater than that used conventionally. This runs counter to economy of material for the frame, but it is apparent that this drawback is insignificant and quite acceptable in view of the advantages obtained with a transmission that is simplified by use of a belt. This arrangement of the belt above the chainstay element also has the advantage of avoiding contact between the latter and any obstacles. Moreover, the unusual position of the crankset housing and crank spindle allows a lowering of the front end of the chainstay element, which makes it possible to ensure that there is no contact with the belt transmission, and moreover, allows compatibility with a standard chain transmission.

In preferred embodiments of the invention, it is possible to make use of one or other of the following arrangements:

The major portion of the chainstay element extends from a front end of the latter which is connected to one of the two frame elements, over a distance representing 60% to 80% of the total developed length of said chainstay element. This arrangement allows possible contact between the belt and the chainstay element to be avoided despite some variation in the diameter of the rear sprocket, but also allows a rear portion of the chainstay element adjacent to the spindle support to be situated relatively high in order to leave free space below the latter and make it possible to fit a standard chain transmission as it will become apparent hereafter.

The major portion of the chainstay element is substantially rectilinear from the front end of the latter and is completed to the rear end of said chainstay element by a curved additional portion. This makes it possible to keep a relatively simple shape for the chainstay element and facilitate its production.

The major portion of the chainstay element extends in an inclined plane at an angle α comprised between 9° and 15° with respect to the horizontal and preferably at approximately 12°. This angle α, which is relatively pronounced in comparison to standard frames, offers a particularly satisfactory compromise between the need for the belt to pass, the possibility of fitting a standard chain transmission and the quantity of material necessary for the frame.

The chainstay element comprises a additional portion extending from the wheel support to the major portion which has ends aligned on a straight line forming an angle β of 30° to 45° with the horizontal and preferably approximately 40°. It is of course possible to provide an angle β substantially greater than 45° so as to free the maximum amount of space for the belt above the chainstay element. However, these preferred values prove to be advantageous in terms of the quantity of material required and for allowing a standard chain transmission to be fitted.

The chainstay element is connected to the lower end of the first frame element, said end being situated at a distance from the ground comprised between 12 cm and 20 cm. The front end of the chainstay element is thus situated at a level well below the usual level, but the ground clearance, however, proves to be sufficient.

The crank spindle is borne by a housing which is rigidly fixed to the second frame element. This arrangement makes it possible to limit the material required for the frame.

The present invention also relates to a bike having one or more of the previous arrangements, for which the rear fork is suitable for receiving a wheel having multiple sprockets, a derailleur with an idler pulley and a chain having a return strand passing through the triangle of this fork and an outgoing strand extending below the chainstay element irrespective of the position of the derailleur. In this way a single frame is obtained which is compatible with a belt transmission and with a standard chain transmission, i.e. with multiple gears selected by a derailleur. This presents a significant manufacturing advantage, both as regards costs and management of production of the frame, and also as regards all of the accessories which are then identical for an entire range of two-wheelers comprising electrically assisted, single gear belt-driven bikes, those with multiple gears using a standard derailleur transmission assembly, or even unassisted multiple-gear models.

Various chainstay element geometries can allow this compatibility of the frame with multiple-gear chain and belt transmissions. However, this requires an accurate adjustment of the geometric values. Each of the arrangements indicated above facilitates this adjustment, and offers the advantage of a simple shape of the chainstay element so as not to complicate production.

Therefore it will be understood that the invention also relates to the actual frame of a bike according to one of the previous arrangements.

Other characteristics and advantages of the invention will become apparent from the following description, which is given by way of non-limitative example, with reference to the figures, in which:

FIG. 4a is an enlarged partial rear view in FIG. 1, FIG. 4b is a similar view in which the belt transmission has been replaced by a chain transmission.

Figure 1:
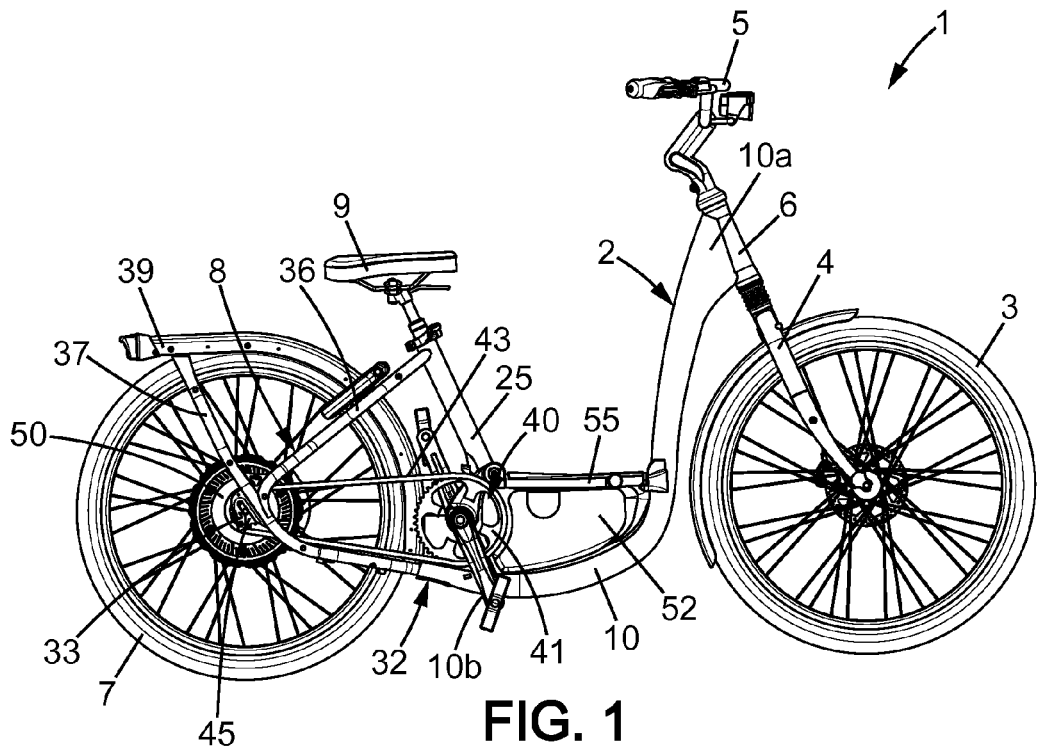
FIG. 1 is a side view of a two-wheeler according to the invention having a belt transmission.

The same references denote identical or similar components in the different figures. FIG. 1 shows a two-wheeler 1 of city bike type with an open frame 2.

The bike 1 comprises in known manner a front wheel 3 borne by a fork 4 rigidly fixed to a handlebar unit 5. The fork 4 is mounted swivelling through a steering tube 6, rigidly fixed to the frame 2. The bike 1 also comprises a rear wheel 7 borne by a rear fork 8 rigidly fixed to the frame 2, as well as a seat unit 9.

The bike 1 is an electrically-assisted pedal bike. It will however be understood from the remainder of the description that it could be a somewhat different type of two-wheeler (for example of electrically-powered light motorbike or scooter type), providing that certain characteristics of the frame 2 and of the rear fork 8 are retained.

The frame 2 comprises a first frame element 10 extending from an upper end 10a rigidly fixed to the steering tube 6, to a lower end 10b. The first frame element 10 substantially corresponds to the part called "down tube" in the field of bikes. It is in fact formed from a tube, but one to which modifications have been made such that it has variations in cross-section and more or less curved portions. Additional elements are also attached by welding. This first frame element 10 could, however, be produced from several assembled elements or also comprise solid elements.

In the embodiment shown, an additional portion 18 of the part forming the first frame element 10 extends beyond the lower end 10b. This production process is advantageous in terms of stiffness, but does not change the geometric definition of the elements of the frame 2 and of the rear fork 8.

The frame 2 comprises a second frame element 20 extending from an upper end 20a on which is mounted the seat unit 9 comprising a seat tube, adjustment means and the actual seat, to a lower end 20b. This end 20b is rigidly fixed to the lower end 10b of the first frame element 10, such that these ends (10b, 20b) can be geometrically merged.

The second frame element 20 has an upper portion 25 here formed by a straight tube. On the other hand, the lower portion is formed of two relatively complex parts (26, 27) which form an irremovable stiff assembly with the rest of the frame 2.

The rear fork 8 usually comprises a pair of chainstay elements (31, 32) extending on either side of the rear wheel 7 from the lower end 10b of the first frame element to a rear wheel spindle support 33.

Each of the left 31 and right 32 chainstay elements is formed partly by the additional portion 18 in their front part which is therefore common to both elements. Their rear portions are formed in the embodiment shown by a single tube 33 shown in FIG. 2 which is curved into a U-shape around the rear wheel 7. It will be understood that this is a particular manufacturing method which can have advantages in terms of simplifying production and stiffness. However, this does not in any way affect the geometric definition of these chainstay elements (31, 32) which must extend between the junction point of the first and second frame elements (10, 20) and the spindle supports 33. They could be separate tubes welded at their front 32a and rear 32b geometric ends shown by dotted lines in FIG. 3. This is however subject to these tubes having the shapes and being arranged as specified below. The rear fork 8 also comprises a pair of seat stays 36 extending from the spindle support 33 to the second frame element 20 and more particularly close to the upper end 20a of the latter.

The rear fork 8 thus forms a stiff and light assembly capable of holding the rear wheel 7 in a vertical plane aligned with the vertical plane of the frame 2.

The rear part of the bike also comprises a mudguard 39 supported by a pair of additional stays 37 which are here rigidly fixed to the frame, but which could of course be attached elements.

Figure 2:
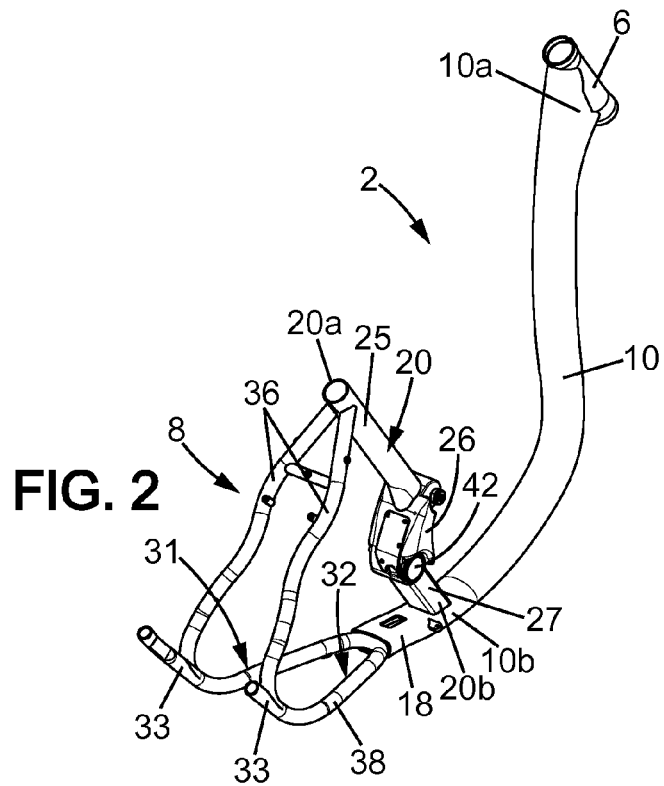
FIG. 2 is a perspective view of the frame of the two-wheeler in FIG. 1.
Figure 3A:
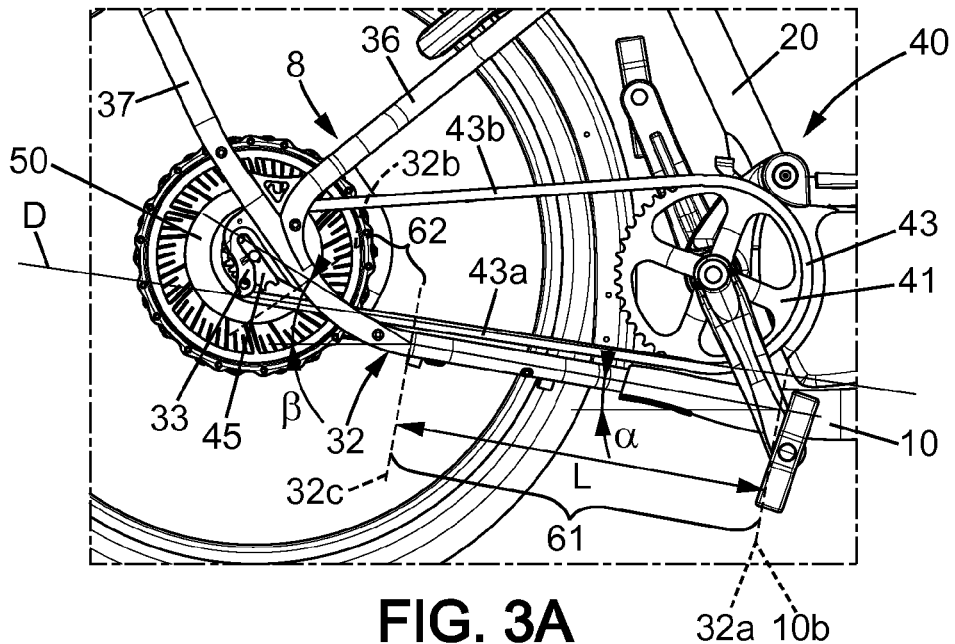
FIG. 3a is an enlarged partial view in FIG. 1, FIG. 3b being a view similar to the previous one in which the belt transmission has been replaced by a chain transmission.

The first and second elements 10, 20, with the rear fork 8, form the frame 2 of the bike 1, as shown in FIG. 2, the additional stays 39 being optional.

In the case of a bike, the latter comprises a transmission assembly comprising a crankset 40 borne by a housing 42 that can be seen in FIG. 2, a transmission member constituted by a belt 43, for the embodiment in FIGS. 1, 3A, 4A and 5A, and a rear sprocket 45. The bike also comprises an electric propulsion system in the embodiment.

This is a pedal-assist system, i.e. it operates automatically, in particular according to the pedaling effort exerted. It could however be a system in which the electric propulsion force is directly controlled by the user.

The propulsion system comprises an electric motor 50 housed in the hub of the rear wheel 7, an electric battery housed in a battery casing 52 and a connection by cable between the battery and the motor. A control and display module, not shown, is also provided on the handlebar unit 5. This allows the electric assist to be operated according to different modes and operating parameters or the charge state of the battery to be displayed.

In order to optimize the arrangement of the battery 1 in the bike, a battery housing space is defined in the frame 2 by the lower portion of the first frame element 10, the lower portion of the second frame element 20 and a footboard unit 55 which extends between the first frame element 10, and the second frame element 20.

Belt transmission is very seldom used in the field of bikes, firstly because it does not allow the use of a gear change system with multiple sprockets and derailleur. Secondly, because the mounting of a belt between the crankset 41 and the rear sprocket 45 poses a problem with standard frames.

In fact, it must be understood that the term "belt" denotes an element forming a continuous and irremovable loop. The belt 43 is made of fibre-reinforced elastomer and has no means of opening for reasons of ease of production, tensile strength and quiet operation. It can have all known cross-sections, in particular a trapezoidal section with smooth inner and lateral surfaces. However a notched belt is preferred, with a relatively flat section with rounded notches on its inner face, which has the advantage of not requiring a high operating tension.

Concerning the first drawback, the inventor has however found that with an electrically assisted bike it was much less necessary to have multiple gears. Assistance during the starting phase with the latest motors, in particular those incorporated in a wheel hub, provides a high enough torque to obtain a quick start, despite the very low speed of rotation of a motor directly engaged with the wheel spindle.

In order to solve the problem of mounting the belt, it is provided that the right-hand chainstay element 32, i.e. situated on the side of the chainring 41 and of the sprocket 45, has a major portion 61 shown in FIG. 3, which is arranged in order to extend below a straight line D defined by the lower end of the chainring 41 and the lower end of the sprocket 45. The belt 43 is arranged between these drive components (41, 45) passing through the continuous triangle formed by the chainstay element 32, the seat stay 36 and the second frame element 20, i.e. with the outward strand 43a which passes slightly above and at a short distance and substantially parallel to the major portion 61 of the chainstay element 32, as can also be seen in FIGS. 4a and 5a. It is of course necessary to provide a certain space between the straight line D, and more generally the plane defined by this straight line D and a horizontal straight line perpendicular to the latter, such that the inner face of the outward strand 43a is situated slightly above this surface, and does not come into contact with the chainstay element 32.

Different geometries of the chainstay element 32 and more generally of the rear fork 8 of the frame 2 are possible in order to produce this characteristic. However account must be taken of all of the components of the bike and of the positioning required for some of them, and also of the impact on the production cost and on the stiffness and strength characteristics.

With these constraints, it appears preferable that the major portion 61 of the chainstay element should extend from the front end 32a of the latter, i.e. from its point of connection to the lower ends (10b, 20b) of the frame elements. It is perfectly possible to consider providing a chainstay element which has at its front end a curved portion in order to lower the height of a major portion situated at a distance from the latter. But the embodiment shown proves to be preferable in terms of solidity, economy of material and particularly advantageous in producing a part of the major portion 61 by the additional portion 18 integrally formed with the first frame element 10.

It will be noted that the lower portion of the first frame element 10 is not straight, as is usual for a down tube, but has a curved shape with a cavity oriented upwards and backwards, approximately in the direction of the seat unit 9. Thus, the lower portion is situated further forward overall with respect to the corresponding portion of a standard down tube.

The lower portion of the second frame element 20 also has a curved shape with concavity oriented forwards. These curves increase the space for the battery casing 52.

On the other hand, for the first frame element 10, it is preferable to produce this in a single piece and without a pronounced angle, especially if it is an open frame as in the embodiment shown.

Placing the crankset housing 42 on the lower portion of the second frame element 20, and not at the junction with the first element, makes it possible to lower the lower end 10b of the first frame element and to further increase the space 60 for receiving the battery casing. In fact, the position of the crankset housing 42 can only be modified vertically a few tens of millimeters around a height of approximately 27 cm which is considered as an optimum between pedaling comfort and the risk of the pedals touching the ground when turning.

The major portion 61 of the chainstay element 32 represents, as its name indicates, the greater part of this chainstay element. More precisely, it extends over a distance representing 60 to 80% of the total developed length, i.e. taking account of the curvature or curvatures of this element. It proves to be preferable for the chainstay element 32, although situated in a position lower than the conventional chainstay elements, to remain close to the belt and still allows certain variations in the lateral position and in the diameter of the chainring 41 and of the sprocket 45.

To this end, but also for the sake of solidity, the major portion 61 of the chainstay element is substantially straight. It is however perfectly possible to provide curved zones in this portion, such as for example for the seat stays 36 in order to form a narrow zone around the wheel.

As shown in FIG. 3, the major portion 61 has a direction, defined by means of its ends, here the front end 32a of the chainstay element and an intermediate section 32c, which is inclined with respect to the horizontal so that its rear end 32c is higher. The angle α formed by this direction with the horizontal is comprised between 9 and 15 degrees, and is for example approximately 12 degrees as in the embodiment shown.

The major portion 61 is followed by an additional portion 62 to complete the chainstay element 32 of the intermediate section 32c to its rear end 32b. This additional portion 62 forms an angle with the major portion 61 in order to accommodate the level of the spindle support 33. It has a direction defined by its end sections (32c, 32b), which forms an angle β of 30 to 45 degrees with the horizontal, and is approximately 40 degrees in the preferred embodiment shown. It is possible to provide an additional portion forming a wider angle for the purpose of lowering the major portion 61 and thus ensuring a wide separation between the belt and the chainstay element 32. But the preferred values are given, as well as the fact that this additional portion 62 is curved, in order to provide a space which remains free below the chainstay element 32 in particular close to its rear end 32b, which is usually occupied by a gear change derailleur.

As it has been seen, the front end 32a of the chainstay element is connected to the lower end 10b of the first frame element and is even constituted by an extension of the part forming this frame element. In order to ensure a substantially lower position of the chainstay element, the lower end 10b of this first frame element is therefore situated much lower than that of its conventional frame, which has the advantage of freeing the space for the legs to pass through or to house the battery casing 52. However, it appears important that the lower face of the first frame element 10 is not situated at a distance from the ground, indicated by the letter h in FIG. 4, which is below a certain value. This value has been determined as 12 cm for use in town in order to avoid impacting with pavements and other obstacles. In the embodiment, this height h is 13.5 cm. It should not however be greater than 20 cm in order to allow the belt to pass under a substantially straight major portion 61.

The housing 42 that can be seen in FIG. 2 is rigidly fixed to the second frame element 20 at a distance from the lower end 10b of the first frame element, and more precisely in the embodiment represented at the junction of parts 26 and 27 which form an elbowed portion with concavity oriented forwards. This vertical distance between the axis of the crankset 40 and the upper face of the chainstay element 32 in vertical alignment with this axis, is preferably slightly greater than the radius of the chainring 41.

Thus, this position of the crankset housing and of the axis of the crankset 40 makes it possible to lower the front end of the chainstay element 32, which makes it possible to ensure that there is no contact with the belt transmission, but also to ensure compatibility with a standard chain transmission while keeping a relatively low position of the crankset. In fact, such a position of the crankset 40 gives the bike optimum pedaling comfort as indicated above, the axis of the crankset being situated close to an optimum distance of 27 cm with respect to the ground.

Figure 3B:
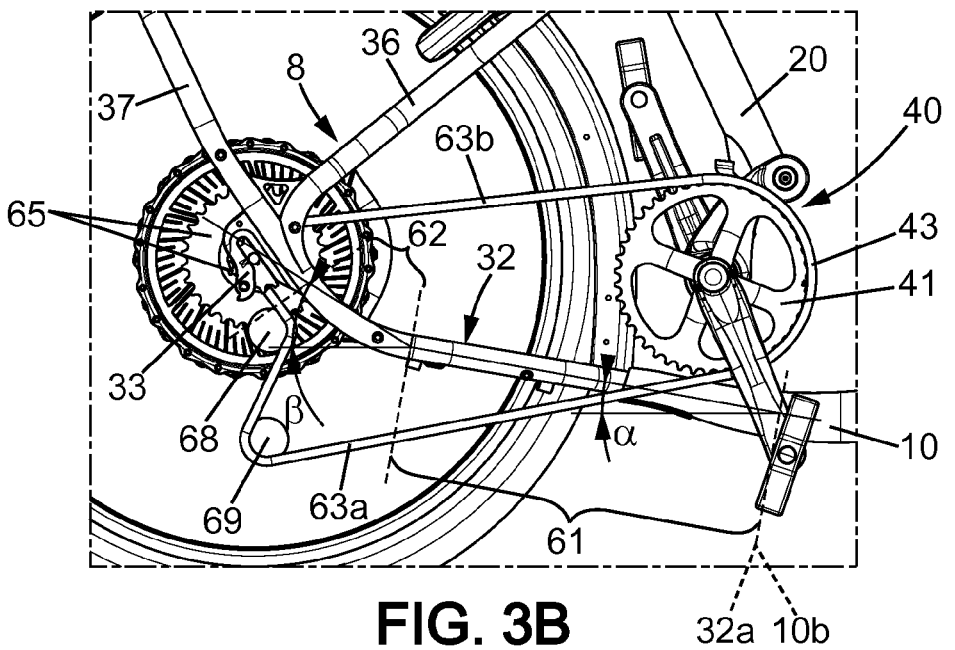
Figure 5B:
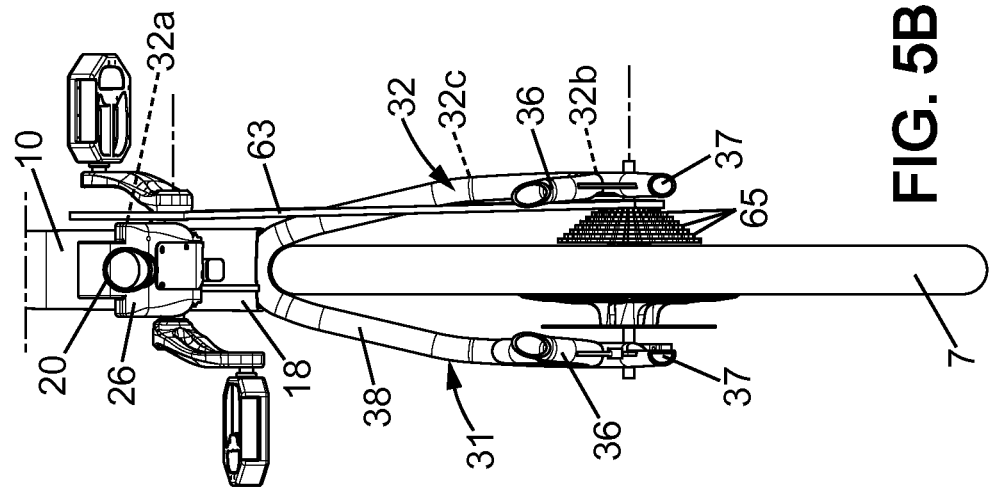
FIG. 5a is an enlarged partial top view in FIG. 1, FIG. 5b being a similar view in which the belt transmission has been replaced by a chain transmission.

According to another important characteristic shown in FIGS. 3B, 4B and 5B, the frame 2 is suitable for receiving without modification a standard multi-gear chain transmission. This transmission comprises a chainring 41 which is entirely similar to the chainring of the belt transmission, but with a chain 63 instead of the belt 43, a rear sprocket assembly 65 and a derailleur of which only the upper idler pulley 68 and the lower idler pulley 69 are shown diagrammatically in FIG. 3B.

As can be seen in these figures, the chain 63 then passes in standard fashion around the chainstay element 32, being easily fitted using a quick link or by detaching a link. It will be noted that the outward strand 63a passes under the chainstay element, as can be seen in FIGS. 3B and 4B, without touching the latter.

The front part of the chainstay element 32, in particular the extension 18, is situated on the inside, i.e. to the left in this case, with respect to the chainring 41 and therefore from the start of the outward strand 63a. Due to the direction of this outward strand 63a descending towards the rear, even for the highest position of the idler pulley 69, and in particular thanks to the fact that the major portion 61 is straight and forms an angle α, there is no interference between this strand and the chainstay element. The same applies to the smaller development, i.e. when the chain is on the rear sprocket 65 on the far left. The idler pulley 69 then adopts a substantially higher position but without really moving back with respect to the spindle support 33. There is no interference with the chainstay element thanks to the additional portion 62 which is curved and has an angle β.

The return strand 63b of the belt is situated substantially in the same position as the return strand 43B of the belt and does not therefore interfere with the frame 2.

Figure 5A:
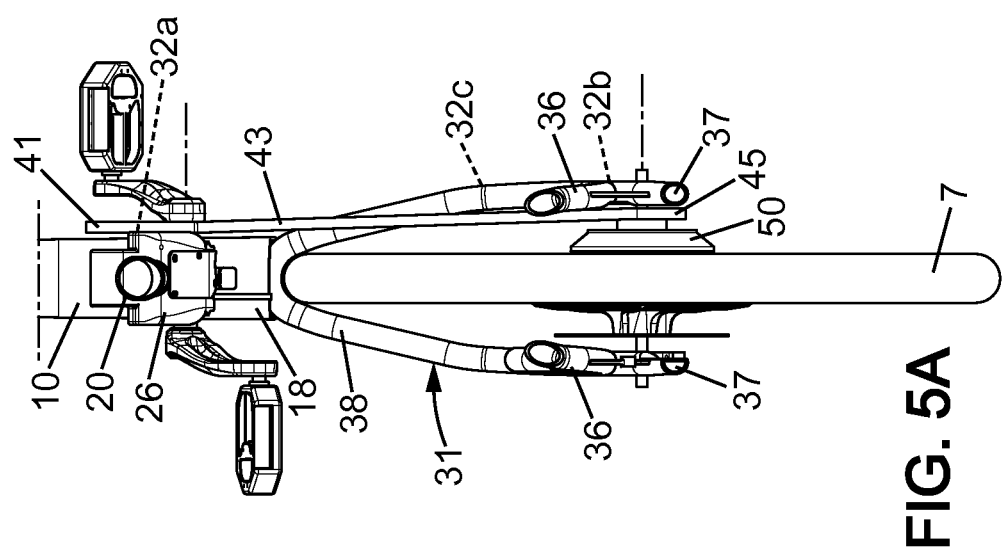

Thanks to this arrangement, it is possible to produce from the same frame bikes with belt transmission and preferably electric power assistance, multi-gear bikes with a standard derailleur, and also bikes combining electric power assistance and having multi-gear systems with standard derailleurs. In the light of FIGS. 5a and 5b, it will be understood that a combined bike can use a motor requiring less space laterally than the motor 50 and/or fewer sprockets than that of the assembly 65. This of course makes it possible to make use of a larger number of common components for these different types of bikes. In addition to an economy of scale, this increases production flexibility. In fact, the frames 2 can be ordered in large numbers and imported in the form of pre-painted bare frames as shown in FIG. 2. The production of the finished bikes can then be allocated between the different types of bikes in a range, simply by choosing the components to be mounted on the single frame model for the entire range.

The embodiment described above is of course not limitative. Variations in geometry are possible, in particular depending on the type of use envisaged for the bike. The manufacturing of the different elements can also be substantially different and comprise more or fewer initial parts which are then assembled mechanically or by welding.

The invention claimed is:

1. A bike comprising:
   a first frame element extending from an upper end carrying a steering tube of a front wheel to a lower end;
   a second frame element extending from an upper end receiving a seat unit to a lower end rigidly fixed to the lower end of the first frame element;
   a rear wheel fork comprising at least one chainstay element extending from the lower end of the first frame element to a rear wheel spindle support and a seat stay extending from said support to the second frame element;
   a crankset having a crank spindle borne by the frame and a driving chainring arranged laterally outside with respect to the first and second frame elements;
   a rear wheel driven by a coaxial sprocket arranged inside with respect to the rear wheel fork; and
   a drive belt forming a continuous loop engaged with the chainring and the sprocket,
   wherein the chainstay element has a major portion arranged below a straight line extending from the lower end of the chainring to the lower end of the sprocket, wherein the belt has an outward strand and a return strand both extending through the triangle formed by the second frame element, the chainstay element and the seat stay, these three elements forming an irremovable stiff assembly, and wherein the axis of the crankset is situated at a vertically measured distance from the upper face of the chainstay element of the first frame element said distance being at most slightly greater than the radius of the chainring and wherein the rear wheel fork is suitable for receiving a wheel having multiple sprockets, a derailleur with an idler pulley and a chain having a return strand passing through the fork triangle and an outward strand extending below the chainstay element irrespective of the position of the derailleur.

2. Bike according to claim 1, in which the major portion of the chainstay element extends from a front end of the chainstay element which is connected to the frame, over a distance representing 60% to 80% of the total developed length of said chainstay element.

3. Bike according to claim 1, in which the major portion of the chainstay element is substantially straight from the front end of the chainstay element and is completed to the rear end of said chainstay element by a curved additional portion.

4. Bike according to claim 1, in which the major portion of the chainstay element extends in an inclined plane at an angle α comprised between 9° and 15° with respect to the horizontal.

5. Bike according to claim 1, in which the chainstay element comprises a additional portion extending from the spindle support to the major portion, which has ends aligned with a straight line forming an angle β of 30° to 45° with the horizontal.

6. Bike according to claim 1, in which the chainstay element is connected to the lower end of the first frame element, said end being situated at a distance h from the ground comprised between 12 cm and 20 cm.

7. Bike according to claim 1, in which the crankset is borne by a housing rigidly fixed to the second frame element.

8. Bike according to claim 1, in which the major portion of the chainstay element extends substantially parallel to the outward strand of the belt.

9. Bike frame suitable for producing a bike according to any one of the previous claims, in which the first frame element, the second frame element, and the rear wheel fork comprising at least the chainstay element, the spindle support and the seat stay, form an irremovable stiff assembly, and in which a crankset housing intended for receiving a crankset has an axis situated at a vertically measured distance from the upper face of the chainstay element, said distance being at most slightly greater than the radius of the chainring of said crankset.

* * * * *